(12) United States Patent
DeBruin

(10) Patent No.: US 7,892,498 B2
(45) Date of Patent: Feb. 22, 2011

(54) POLYESTER PRODUCTION SYSTEM EMPLOYING AN UNAGITATED ESTERIFICATION REACTOR

(75) Inventor: Bruce Roger DeBruin, Lexington, SC (US)

(73) Assignee: Eastman Chemical Company, Kingsport, TN (US)

( * ) Notice: Subject to any disclaimer, the term of this patent is extended or adjusted under 35 U.S.C. 154(b) by 389 days.

(21) Appl. No.: 11/715,546

(22) Filed: Mar. 8, 2007

(65) Prior Publication Data
US 2008/0221296 A1 Sep. 11, 2008

(51) Int. Cl.
*B01J 19/00* (2006.01)

(52) U.S. Cl. .......... 422/138; 422/129; 422/131; 422/134; 422/135; 422/146; 422/188; 422/198; 422/200; 526/64; 526/65; 528/271; 528/272; 528/300; 528/308; 528/308.1; 528/308.3; 528/503

(58) Field of Classification Search .......... 528/271, 528/272, 300, 308, 503, 308.1, 308.3; 526/64, 526/65, 67, 71; 560/205; 425/6; 422/131, 422/129, 138, 198, 200, 137, 146, 134, 135
See application file for complete search history.

(56) References Cited

U.S. PATENT DOCUMENTS

| | | |
|---|---|---|
| 2,727,882 A | 12/1955 | Vodonik |
| 2,820,815 A | 1/1958 | Matuszak et al. |
| 3,174,830 A | 3/1965 | Watzl et al. |
| 3,250,747 A | 5/1966 | Mitchell, Jr. et al. |
| 3,251,657 A | 5/1966 | Bachmann et al. |
| 3,390,965 A | 7/1968 | Ditmar |
| 3,438,942 A | 4/1969 | Scheller et al. |
| 3,496,159 A | 2/1970 | Spence |
| 3,509,203 A | 4/1970 | Michaelis et al. |
| 3,511,615 A | 5/1970 | Roget et al. |
| 3,534,082 A | 10/1970 | Armstrong et al. |
| 3,644,483 A | 2/1972 | Griehl et al. |
| 3,676,485 A | 7/1972 | Lewis et al. |
| 3,787,479 A | 1/1974 | Grehl et al. |
| 3,841,836 A | 10/1974 | Lunsford et al. |
| 3,927,982 A | 12/1975 | Chapman et al. |

(Continued)

FOREIGN PATENT DOCUMENTS

DE 19525579 C1 12/1996

(Continued)

OTHER PUBLICATIONS

USPTO Office Action dated Sep. 22, 2008 for copending U.S. Appl. No. 11/891,149.

(Continued)

*Primary Examiner*—James Seidleck
*Assistant Examiner*—Frances Tischler
(74) *Attorney, Agent, or Firm*—Dennis V. Carmen; Steven A. Owen; Bernard J. Graves, Jr.

(57) ABSTRACT

A polyester production system employing a vertically elongated esterification reactor. The esterification reactor of the present invention is an improvement over conventional CSTR esterification reactors because, for example, in one embodiment, the reactor requires little or no mechanical agitation. Further, in one embodiment, the positioning of the inlets and outlets of the reactor provides improved operational performance and flexibility over CSTRs of the prior art.

36 Claims, 3 Drawing Sheets

U.S. PATENT DOCUMENTS

| | | | |
|---|---|---|---|
| 4,019,866 A | 4/1977 | Jaswal et al. |
| 4,039,515 A | 8/1977 | Rebhan et al. |
| 4,056,514 A | 11/1977 | Strehler et al. |
| 4,110,316 A | 8/1978 | Edging et al. |
| 4,196,168 A | 4/1980 | Lewis |
| 4,200,145 A | 4/1980 | Underwood |
| 4,424,301 A | 1/1984 | Klippert et al. |
| 4,588,560 A | 5/1986 | Degnan et al. |
| 4,680,345 A | 7/1987 | Kobayashi et al. |
| 5,002,116 A | 3/1991 | Hoagland et al. |
| 5,037,955 A | 8/1991 | Dighton |
| 5,202,463 A | 4/1993 | Ruszkay |
| 5,236,558 A | 8/1993 | Buyalos et al. |
| 5,245,057 A | 9/1993 | Shirtum |
| 5,324,853 A | 6/1994 | Jones et al. |
| 5,434,239 A | 7/1995 | Bhatia |
| 5,476,919 A | 12/1995 | Schaeffer |
| 5,599,900 A | 2/1997 | Bhatia |
| 5,750,079 A | 5/1998 | Ueda et al. |
| 5,816,700 A | 10/1998 | Starke, Sr. et al. |
| 5,889,127 A | 3/1999 | Iiyama et al. |
| 6,111,064 A | 8/2000 | Maurer et al. |
| 6,458,916 B1 | 10/2002 | Yamaguchi et al. |
| 6,545,176 B1 | 4/2003 | Tsay et al. |
| 6,590,062 B2 | 7/2003 | Yamaguchi et al. |
| 6,631,892 B1 | 10/2003 | Erickson |
| 6,642,407 B2 | 11/2003 | Rao et al. |
| 6,723,826 B2 | 4/2004 | Yamaguchi et al. |
| 6,814,944 B1 | 11/2004 | Matsui et al. |
| 6,815,525 B2 | 11/2004 | DeBruin |
| 6,861,494 B2 | 3/2005 | DeBruin |
| 6,906,164 B2 | 6/2005 | DeBruin |
| 2002/0161166 A1 | 10/2002 | Nakane et al. |
| 2003/0104203 A1 | 6/2003 | Tam et al. |
| 2004/0068070 A1 | 4/2004 | Martan et al. |
| 2004/0197618 A1 | 10/2004 | Harada et al. |
| 2005/0222371 A1 | 10/2005 | Wilhelm et al. |
| 2006/0008661 A1 | 1/2006 | Wijesundara et al. |
| 2006/0251546 A1 | 11/2006 | Yount et al. |
| 2006/0251547 A1 | 11/2006 | Windes et al. |
| 2007/0065211 A1 | 3/2007 | Kawaguchi |

FOREIGN PATENT DOCUMENTS

| | | | |
|---|---|---|---|
| DE | 10336164 A1 | 3/2005 |
| DE | 102004038466 A1 | 10/2005 |
| DE | 102004034708 A1 | 2/2006 |
| EP | 0105111 A1 | 7/1983 |
| GB | 777128 | 6/1957 |
| GB | 777628 | 6/1957 |
| GB | 1055918 | 1/1967 |
| GB | 1122538 | 8/1968 |
| GB | 1277376 | 6/1972 |
| GB | 1320769 | 6/1973 |
| GB | 2020194 A | 11/1979 |
| JP | 7313865 A | 12/1995 |
| JP | 2004238329 | 8/2004 |
| WO | 9529752 A1 | 11/1995 |
| WO | 9939815 A1 | 8/1999 |
| WO | 2006083250 A1 | 8/2006 |
| WO | 2007065211 A1 | 6/2007 |

OTHER PUBLICATIONS

USPTO Office Action dated Aug. 20, 2008 for copending U.S. Appl. No. 11/635,411.
Copending U.S. Appl. No. 12/173,354, filed Jul. 15, 2008, Bruce Roger DeBruin.
Copending U.S. Appl. No. 12/186,739, filed Aug. 6, 2008, Bruce Roger DeBruin.
Ekivina, N. I. et al., "Structure Formation in Terephthalic Acid Pastes," 1968, Chemical Abstracts Service, Columbus, OH.
USPTO Office Action dated May 7, 2008 for copending U.S. Appl. No. 11/506,105.
International Search Report dated Jun. 20, 2008 for corresponding patent application.
USPTO Office Action dated Jul. 18, 2008 for copending U.S. Appl. No. 11/506,346.
USPTO Office Action dated Dec. 5, 2008 for copending U.S. Appl. No. 12/173,354.
USPTO Notice of Allowance dated Jan. 10, 2008 for copending U.S. Appl. No. 11/506,131.
USPTO Office Action dated Jan. 23, 2008 for copending U.S. Appl. No. 11/635,411.
USPTO Office Action dated Jan. 31, 2008 for copending U.S. Appl. No. 11/506,132.
USPTO Notice of Allowance dated Feb. 13, 2008 for copending U.S. Appl. No. 11/820,244.
USPTO Office Action dated Jan. 25, 2008 for copending U.S. Appl. No. 11/506,105.
USPTO Notice of Allowance dated Mar. 25, 2008 for copending U.S. Appl. No. 11/506,132.
USPTO Notice of Allowance dated Apr. 29, 2008 for copending U.S. Appl. No. 11/891,149.
USPTO office action dated Oct. 11, 2007 for copending U.S. Appl. No. 11/820,244.
USPTO Notice of Allowance dated Oct. 11, 2007 for copending U.S. Appl. No. 10/919,931.
USPTO Office Action dated Dec. 4, 2007 for copending U.S. Appl. No. 11/891,149.
USPTO Notice of Allowance dated Oct. 7, 2008 for copending U.S. Appl. No. 11/506,105.
USPTO Notice of Allowance dated Jan. 2, 2009 for copending U.S. Appl. No. 11/891,149.
USPTO Office Action dated Feb. 4, 2009 for copending U.S. Appl. No. 11/635,411.
USPTO Notice of Allowance dated Jan. 28, 2009 for copending U.S. Appl. No. 11/506,346.
USPTO Office Action dated Apr. 14, 2009 for copending U.S. Appl. No. 11/891,149.
USPTO Office Action dated Apr. 21, 2009 for copending U.S. Appl. No. 11/635,360.
USPTO Office Action dated Apr. 21, 2009 for copending U.S. Appl. No. 11/635,448.
USPTO Office Action dated Apr. 21, 2009 for copending U.S. Appl. No. 11/635,360.
USPTO Office Action dated May 16, 2009 for copending U.S. Appl. No. 12/186,739.
USPTO Office Action dated Jun. 26, 2009 for copending U.S. Appl. No. 12/173,354.
USPTO Office Action dated Jul. 23, 2009 for copending U.S. Appl. No. 11/635,411.
Notice of Allowance dated Sep. 4, 2009 for copending U.S. Appl. No. 11/635,411.
USPTO Office Action dated Sep. 14, 2009 for copending U.S. Appl. No. 11/391,576.
USPTO Notice of Allowance dated Nov. 17, 2009 for copending U.S. Appl. No. 12/173,354.
USPTO Office Action dated Jan. 11, 2010 for copending U.S. Appl. No. 11/635,360.
USPTO Office Action dated Jan. 20, 2010 for copending U.S. Appl. No. 12/186,739.

POLYESTER PRODUCTION SYSTEM EMPLOYING AN UNAGITATED ESTERIFICATION REACTOR

BACKGROUND OF THE INVENTION

1. Field of the Invention

This invention relates to a system for producing melt-phase polyesters. In another aspect, the invention concerns an esterification system utilizing a vertically elongated esterification reactor requiring little or no mechanical agitation.

2. Description of the Prior Art

Melt-phase polymerization can be used to produce a variety of polyesters, such as, for example, polyethylene terephthalate (PET). PET is widely used in beverage, food, and other containers, as well as in synthetic fibers and resins. Advances in process technology coupled with increased demand have lead to an increasingly competitive market for the production and sale of PET. Therefore, a low-cost, high-efficiency process for producing PET is desirable.

Generally, melt-phase polyester production facilities, including those used to make PET, employ an esterification section and a polycondensation section. In the esterification section, polymer raw materials (i.e., reactants) are converted to polyester monomers and/or oligomers. In the polycondensation section, polyester monomers exiting the esterification section are converted into a polymer product having the desired final chain length.

In most conventional melt-phase polyester production facilities, esterification is carried out in one or more mechanically agitated reactors, such as, for example, continuous stirred tank reactors (CSTRs). However, CSTRs and other mechanically agitated reactors have a number of drawbacks that can result in increased capital, operating, and/or maintenance costs for the overall polyester production facility. For example, the mechanical agitators and various control equipment typically associated with CSTRs are complex, expensive, and can require extensive maintenance. Further, conventional CSTRs frequently employ internal heat exchange tubes that occupy a portion of the reactor's internal volume. In order to compensate for the loss in effective reactor volume, CSTRs with internal heat exchange tubes require a larger overall volume, which increases capital costs. Further, internal heat exchange coils typically associated with CSTRs can undesirably interfere with the flow patterns of the reaction medium within the vessel, thereby resulting in a loss of conversion. To increase product conversion, many conventional polyester production facilities have employed multiple CSTRs operating in series, which further increases both capital and operating costs.

Thus, a need exists for a high efficiency polyester process that minimizes capital, operational, and maintenance costs while maximizing product conversion.

SUMMARY OF THE INVENTION

In one embodiment of the present invention, there is provided a process comprising: (a) subjecting a reaction medium to esterification in a vertically elongated esterification reactor; and (b) optionally, agitating the reaction medium in the esterification reactor, wherein less than about 50 percent of the agitation is provided by mechanical agitation.

In another embodiment of the present invention, there is provided a process comprising: (a) subjecting a first reaction medium to esterification in a first esterification zone to thereby produce a first product having a conversion of at least about 70 percent; and (b) subjecting at least a portion of the first product to further esterification in a second esterification zone defined by a second esterification reactor to thereby produce a second product having a conversion of at least about 80 percent, wherein said second esterification reactor defines a fluid inlet for receiving the first product and a liquid outlet for discharging the second product, wherein the liquid outlet is located at a higher elevation than the fluid inlet.

In yet another embodiment of the present invention, there is provided an apparatus comprising a reaction vessel and a plurality of vertically spaced heat exchange tubes located in the reaction vessel. The reaction vessel is elongated along an upright central axis of elongation. The reaction vessel defines a fluid inlet, a plurality of vertically spaced liquid outlets, and a vapor outlet. The fluid inlet is located at a lower elevation than the vapor outlet. The liquid outlets are located at an elevation above the fluid inlet and below the vapor outlet.

BRIEF DESCRIPTION OF THE DRAWINGS

Certain embodiments of the present invention are described in detail below with reference to the enclosed figure, wherein.

DETAILED DESCRIPTION

Figure 1:
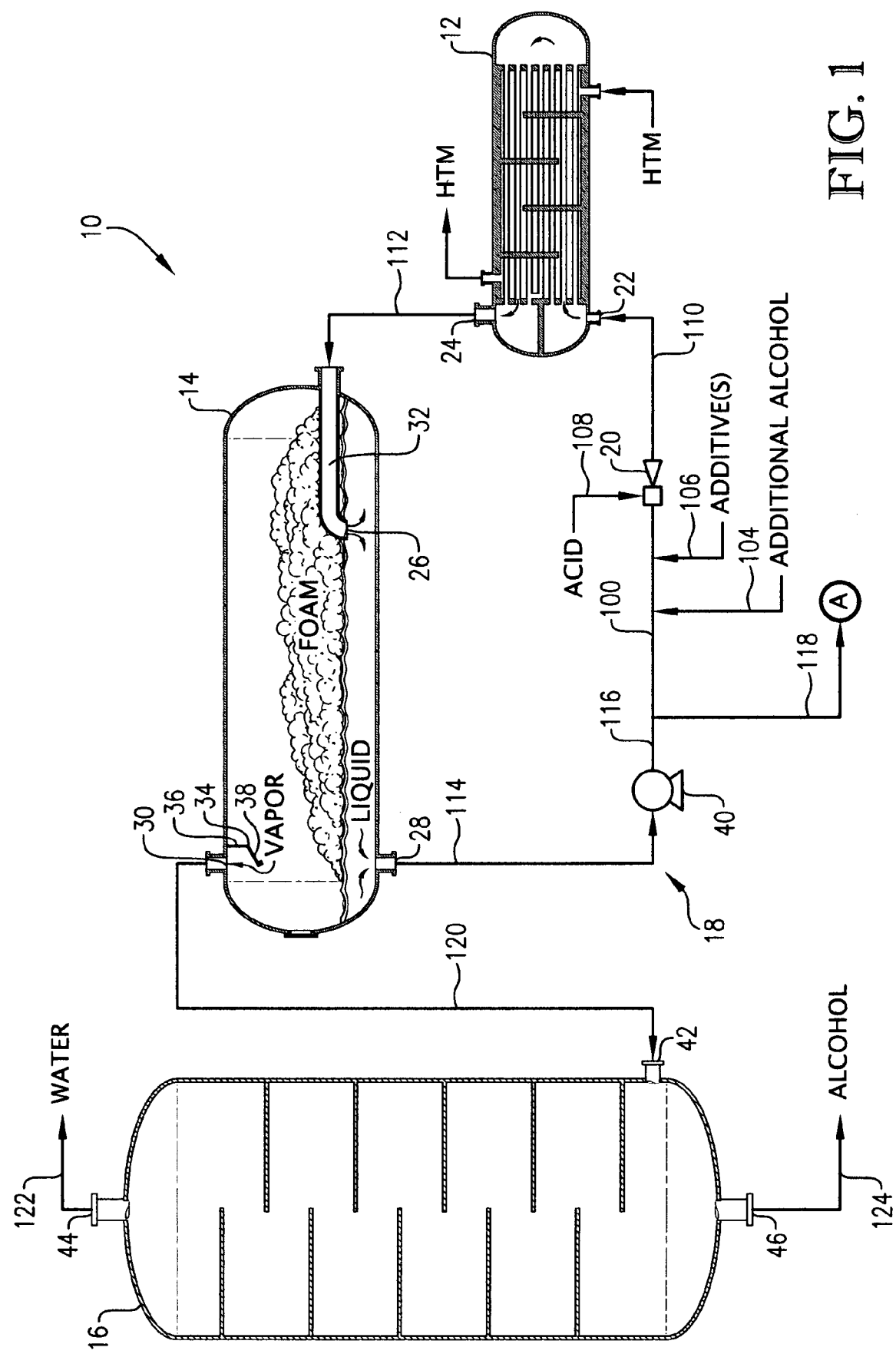
FIG. 1 is a schematic depiction of a first stage esterification system configured in accordance with one embodiment of the present invention and suitable for use in a melt-phase polyester production facility.

The present invention can be employed in melt-phase polyester production facilities capable of producing a variety of polyesters from a variety of starting materials. As used herein, the term "polyester" also includes polyester derivatives, such as, for example, polyetheresters, polyester amides, and polyetherester amides. Examples of melt-phase polyesters that can be produced in accordance with the present invention include, but are not limited to, homopolymers and copolymers of polyethylene terephthalate (PET), PETG (PET modified with 1,4-cyclohexane-dimethanol (CHDM) comonomer), fully aromatic or liquid crystalline polyesters, biodegradable polyesters, such as those comprising butanediol, terephthalic acid and adipic acid residues, poly(cyclohexane-dimethylene terephthalate) homopolymer and copolymers, and homopolymers and copolymers of CHDM and cyclohexane dicarboxylic acid or dimethyl cyclohexanedicarboxylate.

In one embodiment of the present invention, polyester starting materials comprising at least one alcohol and at least one acid are subjected to esterification in an initial section of the process. The acid starting material can be a dicarboxylic acid such that the final polyester product comprises at least one dicarboxylic acid residue having in the range of from about 4 to about 15 or from 8 to 12 carbon atoms. Examples of dicarboxylic acids suitable for use in the present invention can include, but are not limited to, terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, 2,2-dimethyl-1,3-propandiol, dicarboxylic acid, succinic acid, glutaric acid, adipic acid, azelaic acid, sebacic acid, and mixtures thereof. In one embodiment, the acid starting material can be a corresponding ester, such as dimethyl terephthalate instead of terephthalic acid.

The alcohol starting material can be a diol such that the final polyester product can comprise at least one diol residue, such as, for example, those originating from cycloaliphatic diols having in the range of from about 3 to about 25 carbon atoms or 6 to 20 carbon atoms. Suitable diols can include, but are not limited to, ethylene glycol (EG), diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4tetramethyl-cyclobutanediol, 2,2-bis-(3-hydroxyethoxyphenyl)-propane, 2,2-bis-(4-hydroxy-propoxyphenyl)-propane, isosorbide, hydroquinone, BDS-(2,2-(sulfonylbis)4,1-phenyleneoxy)) bis(ethanol), and mixtures thereof.

In addition, in one embodiment, the starting materials can comprise one or more comonomers. Suitable comonomers can include, for example, comonomers comprising terephthalic acid, dimethyl terephthalate, isophthalic acid, dimethyl isophthalate, dimethyl-2,6-naphthalenedicarboxylate, 2,6-naphthalene-dicarboxylic acid, ethylene glycol, diethylene glycol, 1,4-cyclohexane-dimethanol (CHDM), 1,4-butanediol, polytetramethyleneglyocl, trans-DMCD, trimellitic anhydride, dimethyl cyclohexane-1,4 dicarboxylate, dimethyl decalin-2,6 dicarboxylate, decalin dimethanol, decahydronaphthalane 2,6-dicarboxylate, 2,6-dihydroxymethyl-decahydronaphthalene, hydroquinone, hydroxybenzoic acid, and mixtures thereof.

In accordance with one embodiment of the present invention, one or more additives can be added to the starting materials, the polyester, and/or the polyester precursors at one or more locations within the process. Suitable additives can include, for example, trifunctional or tetrafunctional comonomers, such as trimellitic anhydride, trimethylolpropane, pyromellitic dianhydride, pentaerythritol, or other polyacids or polyols; crosslinking or branching agents; colorant; toner; pigment; carbon black; glass fiber; filler; impact modifier; antioxidant; UV absorbent compound; and oxygen scavenging compound.

In general, the polyester production process according to one embodiment of the present invention can employ two main sections. The first section reacts starting materials (also referred to herein as "raw materials" or "reactants") into monomers and/or oligomers. The second section further reacts the monomers and/or oligomers into the final polyester product.

If the starting materials entering the first section include acid end groups, such as, for example, terephthalic acid or isophthalic acid, the first section can be referred to as esterification. If the starting materials have methyl end groups, such as, for example, dimethyl terephthalate or dimethyl isophthalate, the first section can be referred to as ester exchange or trans-esterification. For simplicity, the term "esterification," as used herein, includes both esterification and ester exchange reactions. Therefore, if the first section is used for esterification, ester exchange, or trans-esterification, it can be referred to as the "esterification section" of the process. According to one embodiment of the present invention, esterification can be carried out in one or more stages of the esterification section at a temperature in the range of from about 220° C. to about 300° C., or about 235° C. to about 290° C., or 245° C. to 280° C. and a pressure of less than about 25 psig, or a pressure in the range of from about 1 psig to about 10 psig, or 2 psig to 5 psig. In one embodiment, the average chain length of the monomer and/or oligomer exiting the esterification section can be less than about 25, from about 1 to about 20, or from 5 to 15.

The second section of the process can be referred to as the polycondensation section. The polycondensation section can employ a single step process, or can be divided into a prepolycondensation (or prepolymerization) step and a final (or finishing) polycondensation step. Generally, longer chain polymers can be produced via a multi-stage polycondensation process. Generally, polycondensation can be carried out in the polycondensation section at a temperature in the range of from about 220° C. to about 350° C., or about 240° C. to about 320° C. and a sub-atmospheric (e.g., vacuum) pressure. When polycondensation is carried out in a two-stage process, the prepolymerization (or prepolymer) reactor can convert the monomer exiting the esterification section into an oligomer having an average chain length in the range of from about 2 to about 40, from about 5 to about 35, or from 10 to 30. The finisher reactor then converts the oligomer/polymer mixture into a final polymer product having the desired average chain length, typically greater than about 30, greater than about 50, greater than about 75, or greater than 90.

Figure 2:
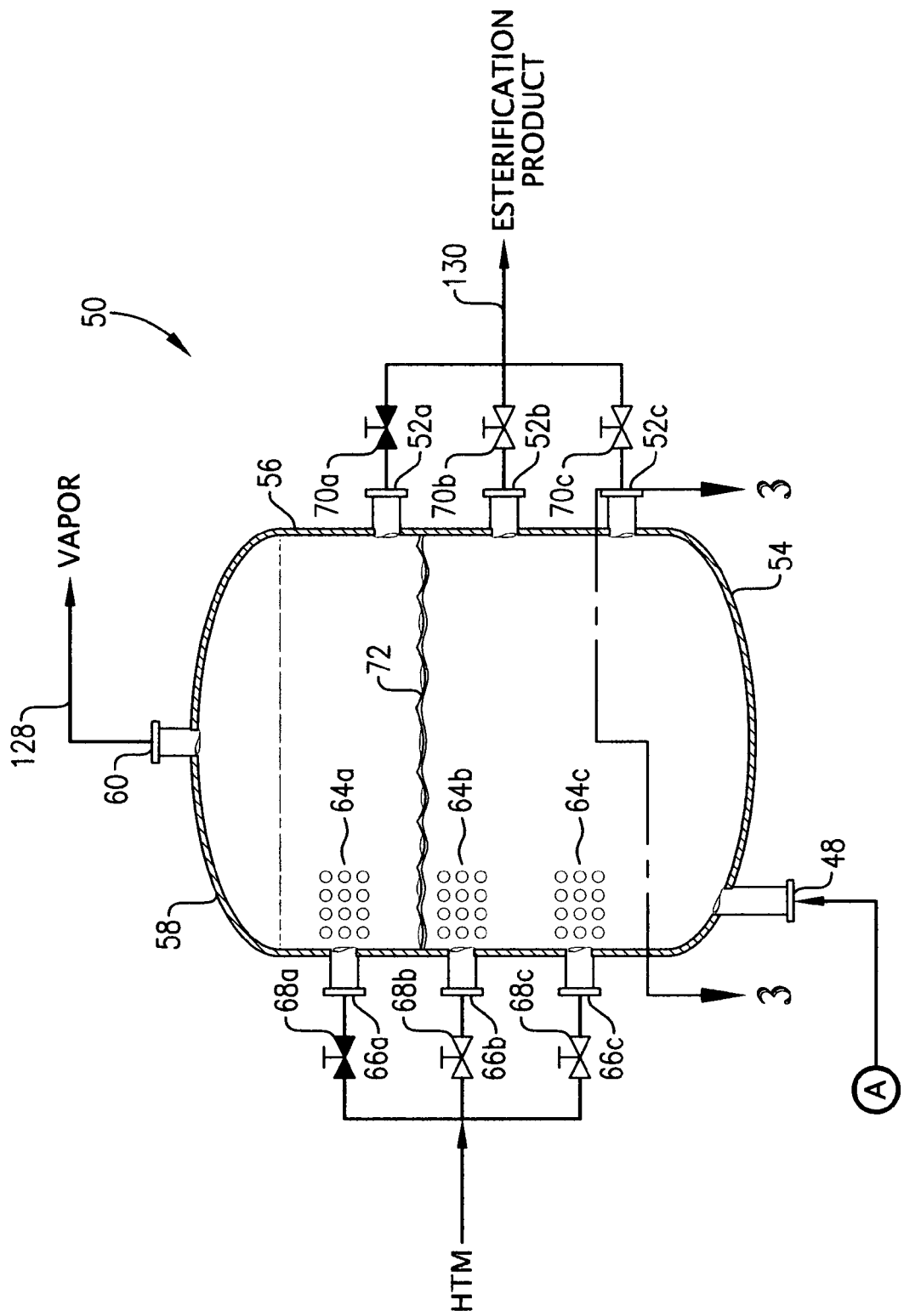
FIG. 2 is a schematic depiction of a second stage esterification reactor configured in accordance with one embodiment of the present invention and suitable for use in a melt-phase polyester production facility, with line A connecting the second stage esterification reactor of FIG. 2 with the first stage esterification system of FIG. 1.
Figure 3:
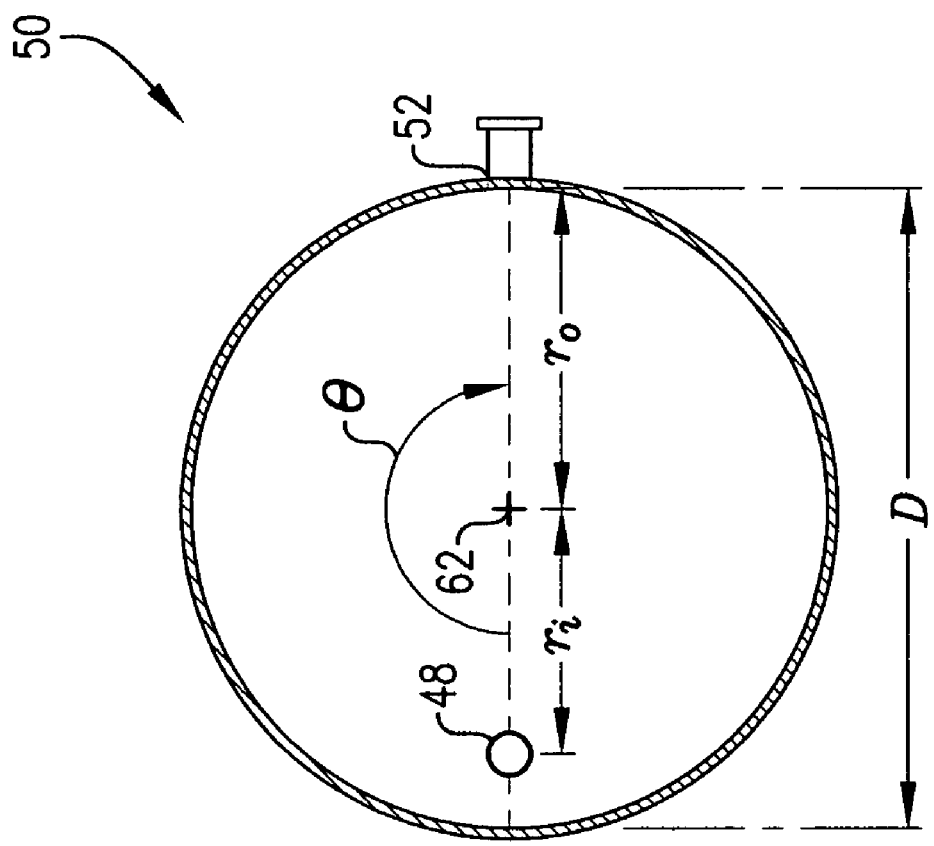
FIG. 3 is a sectional view of the second stage esterification reactor of FIG. 2, taken along line 3-3 in FIG. 2.

A multi-stage esterification section configured in accordance with one embodiment of the present invention is depicted in FIGS. 1-3. In particular, FIG. 1 illustrates an exemplary first stage esterification system, while FIGS. 2 and 3 illustrate an exemplary second stage esterification reactor. The multi-stage esterification section of FIGS. 1-3 will now be described in greater detail.

Referring now to FIG. 1, a first stage esterification system 10 configured in accordance with one embodiment of the present invention is illustrated as generally comprising a heat exchanger 12, an esterification vessel 14, a distillation column 16, and a recirculation loop 18. In general, the process carried out in first stage esterification system 10 includes the following broad steps: (1) introducing an esterification feed into heat exchanger 12; (2) heating and partially esterifying the esterification feed in heat exchanger 12; (3) introducing at least a portion of the heated and partially esterified product from heat exchanger 12 into esterification vessel 14; (4) further esterifying the partially esterified product from heat exchanger 12 in esterification vessel 14; (5) separating a liquid product from a vapor byproduct in esterification vessel 14; (6) introducing at least a portion of the vapor byproduct from esterification vessel 14 into distillation column 16; (7) separating the vapor byproduct into a predominately water overhead stream and a predominately alcohol bottom stream in distillation column 16; (8) routing a recirculation portion of the liquid product from esterification vessel 14 back to heat exchanger 12 via recirculation loop 18; (9) while the recirculation portion of the liquid product is flowing through recirculation loop 18, adding thereto recirculated alcohol from distillation column 16, fresh alcohol, additive(s), and/or acid; and (10) withdrawing a product portion of the liquid product from esterification vessel 14 for further downstream processing.

As indicated above, first stage esterification can be carried out in both heat exchanger 12 and esterification vessel 14 of esterification system 10. Therefore, heat exchanger 12 and esterification vessel 14 can each be referred to as "first stage esterification reactors" that each define a portion of a "first stage esterification zone." However, because an additional function of heat exchanger 12 can be to heat the reaction medium processed therein, heat exchanger 12 can also be referred to as a "heater" that defines a "heating zone." Further, since an additional function of esterification vessel 14 can be to promote vapor/liquid disengagement, esterification vessel 14 can also be referred to as a "disengagement vessel" that defines a "disengagement zone." The configuration and operation of first stage esterification system 10, illustrated in FIG. 1, will now be described in greater detail.

Referring again to FIG. 1, a recirculated liquid product stream, discussed in more detail below, is transported through a recirculation conduit 100 of first stage esterification system 10. As illustrated in FIG. 1, the following materials can be added to the recirculated liquid product stream flowing through recirculation conduit 100: (a) additional fresh alcohol introduced via conduit 104 and (b) one or more additives introduced via conduit 106. In another embodiment, at least a portion of one or more streams in conduits 104 and/or 106 can be added to the stream exiting esterification vessel 14 in conduit 114, which is discussed in detail below. In yet another embodiment, at least a portion of one or more streams in conduits 104 and/or 106 can be introduced directly into a yet-to-be-discussed recirculation pump 40. The fresh alcohol in conduit 104 can be any of the alcohols discussed above as being suitable for use as starting materials in the system of the present invention. According to one embodiment, the alcohol can be ethylene glycol. The one or more additives in conduit 106 can be any of the additives discussed above as being suitable for used in the system of the present invention.

Additional acid from conduit 108 can also be added to the stream flowing through recirculation conduit 100. The acid introduced into recirculation conduit 100 via conduit 108 can be any of the acids discussed above as being suitable for use as starting materials in the system of the present invention. The acid in conduit 108 can be in the form of a liquid, slurry, paste, or dry solids. In one embodiment, the acid in conduit 108 can be solid particles of terephthalic acid.

In one embodiment of the present invention, the acid in conduit 108 is added to the recirculation stream in conduit 100 in the form of small, substantially dry, solid particles (e.g., a powder). In such an embodiment, the acid fed to conduit 100 can contain less than about 5 weight percent, less than about 2 weight percent, or less than 1 weight percent liquid. This method of dry acid addition can eliminate the need for complex and expensive mechanically agitated tanks traditionally used to convert the solid acid particles into a paste or slurry before introducing the resulting mixture into the esterification process.

As illustrated in FIG. 1, a pressure reducer 20 can be employed to permit the direct addition of a solid acid reactant into recirculation conduit 100 without being in the form of a paste or slurry. In one embodiment of the present invention, the solid acid reactant can be added to recirculation conduit 100 at a location where the pressure of the recirculation stream has been reduced via pressure reducer 20. Pressure reducer 20 can be any apparatus known in the art to be capable of reducing the pressure of a primarily fluid stream so that material can be added to the pressure-reduced stream via an opening proximate the zone of reduced pressure. An eductor is one example of an apparatus suitable for use as pressure reducer 20.

As illustrated in FIG. 1, the solid acid reactant in conduit 108 can be added to recirculation loop 18 downstream of the additional alcohol and additive injection points. Further, it can be advantageous to introduce the solid acid reactant into the top portion of recirculation conduit 100 in order to expedite the dissolution of the solid acid particles as they descend into the recirculation stream. The presence of polyester monomers and/or oligomers in the recirculation stream can also enhance the dissolution of the solid acid particles added to recirculation conduit 100. In one embodiment of the present invention, the stream in recirculation conduit 100 can have an average chain length in the range of from about 1 to about 20, about 2 to about 18, or 5 to 15.

Generally, the amount of alcohol and acid added to the recirculation stream in recirculation conduit 100 can any amount necessary to provide the desired production rate and the desired alcohol-to-acid ratio. In one embodiment of the present invention, the molar alcohol-to-acid ratio of the esterification feed stream exiting recirculation conduit 100 is in the range of from about 1.005:1 to about 10:1, about 1.01:1 to about 8:1, or 1.05:1 to 6:1.

The combined stream exiting recirculation conduit 100 and/or pressure reducer 20 can be introduced as an esterification feed into an inlet 22 of heat exchanger 12 via a feed conduit 110. In heat exchanger 12, the esterification feed/reaction medium is heated and subjected to esterification conditions. In accordance with one embodiment of the present invention, the temperature increase of the reaction medium between the inlet 22 and an outlet 24 of heat exchanger 12 can be at least about 50° F., at least about 75° F., or at least 85° F. Generally, the temperature of the esterification feed entering inlet 22 of heat exchanger 12 can be in the range of from about 220° C. to about 260° C., about 230° C. to about 250° C., or 235° C. to 245° C. Generally, the temperature of the esterification product exiting outlet 24 of heat exchanger 12 can be in the range of from about 240° C. to about 320° C., about 255° C. to about 300° C., or 275° C. to 290° C. The reaction medium in heat exchanger 12 can be maintained at a pressure in the range of from about 5 to about 50 psig, from about 10 to about 35 psig, or from 15 to 25 psig.

As discussed previously, heat exchanger 12 can also be considered an esterification reactor because at least a portion of the reaction medium flowing therethrough can undergo esterification. The amount of esterification carried out in accordance with the present invention can be quantified in terms of "conversion." As used herein, the term "conversion" is used to describe a property of the liquid phase of a stream that has been subjected to esterification, wherein the conversion of the esterified stream indicates the percentage of the original acid end groups that have been converted (i.e., esterified) to ester groups. Conversion can be quantified as the number of converted end groups (i.e., alcohol end groups) divided by the total number of end groups (i.e., alcohol plus acid end groups), expressed as a percentage. While conversion is used herein, it should be understood that average chain length, which describes the average number of monomer units that a compound comprises, could also be appropriate for describing the characteristics of the streams of the present invention as well.

According to one embodiment, the esterification reaction carried out in heat exchanger 12 can increase the conversion of the reaction medium between inlet 22 and outlet 24 by at least about 5, at least about 10, at least about 15, at least about 20, at least about 30, or at least 50 percentage points. Generally, the esterification feed stream introduced into inlet 22 of heat exchanger 12 has a conversion of less than about 90 percent, less than about 75 percent, less than about 50 percent, less than about 25 percent, less than about 10 percent, or less than 5 percent, while the esterification product stream exiting outlet 24 of heat exchanger 12 has a conversion of at least about 50 percent, at least about 60 percent, at least about 70 percent, at least about 75 percent, at least about 80 percent, at least about 85 percent, at least about 95 percent, or at least 98 percent.

In one embodiment of the present invention, the esterification reaction carried out in heat exchanger 12 takes place at a significantly reduced residence time relative to conventional esterification processes. For example, the average residence time of the reaction medium flowing through heat exchanger 12 can be less than about 60 minutes, less than about 45 minutes, less than about 35 minutes, or less than 20 minutes. This relatively short residence time can even be achieved at high, commercial scale production rates. Thus, in one embodiment, the product stream exits outlet 24 of heat exchanger 12 at a flow rate of at least about 10,000 pounds per hour (lb/h), at least about 25,000 lb/h, at least about 50,000 lb/h, or at least 100,000 lb/h.

Turning now the specific configuration of heat exchanger 12. In accordance with one embodiment of the present invention, heat exchanger 12 can be a horizontally elongated, shell-and-tube heat exchanger. An internal flow passageway through heat exchanger 12 can be defined by the heat exchange tubes through which the reaction medium flows as it is heated and esterified. This internal flow passageway can be considered to be a "first esterification zone" of first stage esterification system 10. Generally the aggregate volume of the internal flow passageway through heat exchanger can be in the range of from about 10 to about 1,500 cubic feet ($ft^3$), about 100 to about 800 $ft^3$, or 200 to 600 $ft^3$. The average inner diameter of the individual heat exchange tubes can be less than about 4 inches, or in the range of from about 0.25 to about 3 inches, or 0.5 to 2 inches.

As shown in FIG. 1, a stream of warmed heat transfer medium (HTM) can enter the shell-side of heat exchanger 12 and at least partly surround at least a portion of the heat exchange tubes in order to heat the reaction medium flowing therethrough. In one embodiment of the present invention, the heat transfer coefficient associated with the heating of the reaction medium in heat exchanger 12 can be in the range of from about 0.5 to about 200 BTU per hour per ° F. per square foot (BTU/h·° F.·$ft^2$), about 5 to about 100 BTU/h·° F.·$ft^2$, or from 10 to 50 BTU/h·° F.·$ft^2$. The total amount of heat transferred to the reaction medium in heat exchanger 12 can be in the range of from about 100 to about 5,000 BTU per pound of reaction medium (BTU/lb), about 400 to about 2,000 BTU/lb, or 600 to 1,500 BTU/lb.

As depicted in FIG. 1, the partially esterified product exiting heat exchanger 12 via outlet 24 can be transported to esterification vessel 14 via conduit 112. The partially esterified stream in conduit 112 can be introduced into the internal volume of esterification vessel 14 via a fluid inlet 26. As discussed previously, in esterification vessel 14, the partially esterified stream is subjected to further esterification and phase separation. Thus, the internal volume defined within esterification vessel 14 can be considered to be an "esterification zone" and/or a "disengagement zone." Generally, the reaction medium in esterification vessel 14 flows substantially horizontally through the internal volume. As the reaction medium flows away from fluid inlet 26 and undergoes esterification, vapor byproducts escape the liquid phase and flow generally above the liquid phase. The separated liquid product can exit esterification vessel 14 via a liquid outlet 28, while the separated vapor byproduct can exit esterification vessel 14 via vapor outlet 30.

The esterification reaction carried out in esterification vessel 14 can increase the conversion of the reaction medium processed therein so the liquid product exiting liquid outlet 28 has a conversion that is at least about 1 percentage point, at least about 2 percentage points, or at least 5 percentage points higher than the conversion of the fluid stream entering fluid inlet 26. Generally, the liquid product exiting liquid outlet 28 of esterification vessel 14 can have conversion of at least about 80 percent, at least about 85 percent, at least about 90 percent, at least 95 percent, or at least about 98 percent.

The conversion achieved in esterification vessel 14 can occur during a relatively short residence time and with little or no heat input. For example, the average residence time of the reaction medium in esterification vessel 12 can be less than about 200 minutes, less than about 60 minutes, less than about 45 minutes, less than about 30 minutes, or less than 15 minutes. Further, the amount of heat transferred to the reaction medium in esterification vessel 14 can be less than about 100 BTU per pound of reaction medium (BTU/lb), less than about 20 BTU/lb, less than about 5 BTU/lb, or less than 1 BTU/lb.

With minimal or no heat input in esterification vessel 14, the average temperature of the liquid product exiting liquid outlet 28 of esterification vessel 14 can be within about 50° C., about 30° C., about 20° C., or 15° C. of the average temperature of the fluid entering esterification vessel 14 via fluid inlet 26. Generally, the average temperature of the liquid product exiting liquid outlet 28 of esterification vessel 14 can be in the range of from about 220° C. to about 320° C., about 240° C. to about 300° C., or about 250° C. to about 275° C.

Turning now to the specific configuration of esterification vessel 14. In the embodiment illustrated in FIG. 1, esterification vessel 14 is a substantially empty, unagitated, unheated, generally cylindrical, horizontally elongated vessel. Esterification vessel 14 and can have a length-to-diameter (L:D) ratio of less than about 10:1, in the range of from about 1.25:1 to about 8:1, about 1.5:1 to about 6:1, or 2:1 to 4.5:1. In one embodiment, fluid inlet 26, liquid outlet 28, and vapor outlet 30 are spaced from on another in a manner that provides sufficient esterification and enhances disengagement/separation of the vapor, liquid, and foam phases. For example, liquid outlet 28 and vapor outlet 30 can be horizontally spaced from the fluid inlet 26 by at least about 1.25D, at least about 1.5D, or at least 2.0D. Further, liquid outlet 28 and vapor outlet 30 can be vertically spaced from one another by at least about 0.5D, at least about 0.75D, or at least 0.95D.

As illustrated in FIG. 1, esterification vessel 14 can comprise a fluid distributor 32 to aid in the effective distribution of the feed to esterification vessel 14. In the embodiment illustrated in FIG. 1, fluid distributor is simply a substantially horizontally extending pipe having a downwardly curved distal end that defines fluid inlet 26 with a downwardly facing orientation. Alternatively, fluid distributor 32 can define a plurality of openings for discharging the partially esterified feed at multiple horizontally spaced locations in esterification vessel 14. In one embodiment of the present invention, the average depth of the reaction medium in esterification vessel 14 is maintained at less than about 0.75D, less than about 0.50D, less than about 0.25D, or less than 0.15D as it travels substantially horizontally through esterification vessel 14.

As shown in FIG. 1, upon entering esterification vessel 14, the reaction medium exiting fluid distributor 32 can begin to foam as the vapor bubbles disengage from the liquid portion of the reaction medium. Generally, foam production can decrease along the length of esterification vessel 14 as the vapor disengages from the liquid phase of the reaction medium so that, in one embodiment, substantially no foam exits liquid outlet 28 and/or vapor outlet 30 of esterification vessel 14.

To help ensure that substantially no foams exits vapor outlet 30 of esterification vessel 14, a downwardly extending baffle 34 can be employed in esterification vessel 14. Baffle 34 can generally be disposed between fluid inlet 26 and vapor outlet 30 of esterification vessel 14, but closer to vapor outlet 30 than to fluid inlet 26. Baffle 34 can extend downwardly from the top of esterification vessel 14 proximate vapor outlet 30 and can function to physically block the flow of foam, if any, towards vapor outlet 30. In one embodiment of the present invention, baffle 34 can present a bottom edge vertically spaced at least about 0.25D, at least about 0.5D, or at least 0.75D from the bottom of esterification vessel 14. In the embodiment illustrated in FIG. 1, baffle includes a downwardly extending portion 36 and a laterally extending portion 38. Downwardly extending portion 36 can extend downwardly from a location proximate vapor outlet 30, while laterally extending portion 38 can extend transversely from the bottom end of downwardly extending portion 36 to a location generally under vapor outlet 30.

The total internal volume defined within esterification vessel 14 can depend on a number of factors, including, for example, the overall hydrodynamic requirements of esterification system 10. In one embodiment of the present invention, the total internal volume of esterification vessel 14 can be at least about 25 percent, at least about 50 percent, at least about 75 percent, at least about 100 percent, or at least 150 percent of the total internal volume of recirculation loop 18, described in further detail below. In yet another embodiment of the present invention, the total internal volume of esterification vessel 14 can be at least about 25 percent, at least about 50 percent, at least about 75 percent, or at least 150 percent of the aggregate internal volume of recirculation loop 18, the flow passageway within heat exchanger 12, and product conduit 112.

Referring again to FIG. 1, the vapor stream exiting vapor outlet 30 of esterification vessel 14 via conduit 120 can be routed to a fluid inlet 42 of distillation column 16. The vapor byproduct stream in conduit 120 can comprise water and alcohol. The water and alcohol can be substantially separated from one another in distillation column 16 to thereby produce a predominately water overhead vapor stream exiting distillation column 16 via overhead outlet 44 and a predominately alcohol bottom liquid stream exiting distillation column 16 via lower outlet 46. Distillation column 16 can be any device capable of separating a stream into a predominantly vapor overhead product and a predominantly liquid bottoms product based on the relative volatilities of the components of the feed stream. Distillation column 16 can comprise internals such as, for example, trays, random packing, structured packing, or any combination thereof.

According to one embodiment of the present invention, the predominantly water overhead vapor stream exiting distillation column 16 via overhead outlet 44 can comprise at least about 50 mole percent, at least about 60 mole percent, or at least 75 mole percent water. The overhead vapor product discharged from outlet 44 of distillation column 16 can be routed via conduit 122 to subsequent processing, storage, or disposal, such as, for example, a wastewater processing unit or a disposal means employing, for example, incineration.

The predominately alcohol bottom liquid stream exiting distillation column 14 via lower outlet 46 can comprise at least about 50 mole percent, at least about 60 mole percent, or at least 75 mole percent alcohol (e.g., ethylene glycol). In one embodiment of the present invention, the predominantly alcohol stream withdrawn from lower outlet 46 of distillation column 16 can have a temperature of at least about 150° C., in the range of from about 175° C. to about 250° C., or 190° C. to 230° C. and a pressure in the range of from about 0.25 psig to about 50 psig, about 0.5 psig to about 35 psig, or 1 psig to 25 psig. As shown in FIG. 1, the liquid stream discharged from lower outlet 46 of distillation column can be routed via conduit 124 to further processing, storage, and/or reuse.

As illustrated in FIG. 1, a liquid ester product can exit liquid outlet 28 of esterification vessel 14 and can thereafter be introduced into recirculation loop 18. Recirculation loop 18 defines a flow passageway from liquid outlet 28 of esterification vessel 14 to inlet 22 of heat exchanger 12. Recirculation loop 18 generally comprises a liquid product conduit 114, a recirculation pump 40, a pump discharge conduit 116, recirculation conduit 100, pressure reducer 20, and feed conduit 110. The liquid ester product discharged from esterification vessel 14 can flow initially through product conduit 114 to the suction of recirculation pump 40. The stream exiting pump 40 can be passed though pump discharge conduit 116 and thereafter split into a product portion transported via ester product conduit 118 and a recirculation portion transported via recirculation conduit 100. The splitting of the stream exiting pump 40 can be carried out so that the ratio of the mass flow rate of the recirculation portion in conduit 100 to the mass flow rate of the product portion in conduit 118 can be in the range of from about 0.25:1 to about 30:1, about 0.5:1 to about 20:1, or 2:1 to 15:1. As previously discussed, the recirculation portion in conduit 100 can eventually be employed as the feed to heat exchanger 12, after the addition of fresh alcohol via conduit 104, additive(s) via conduit 106, and/or acid via conduit 108.

The product portion of the liquid ester product in conduit 118 can be routed to a downstream location for further processing, storage, or other use. In one embodiment, at least a fraction of the product portion in conduit 118 can be subjected to further esterification in a second stage esterification reactor, described in detail below.

Referring now to FIG. 2, a portion of the product from first stage esterification system 10 (FIG. 1) can be routed to a fluid inlet 48 of a second stage second stage esterification reactor 50 (FIG. 2) via conduit A. In second stage esterification reactor 50, the reaction medium is heated and subjected to esterification conditions. However, in contrast to the complex and maintenance-intensive CSTRs of the prior art, second stage esterification reactor 50 can be a simple and reliable reaction vessel that provides little or no mechanical agitation to the reaction medium processed therein. In one embodiment of the present invention, less than about 50 percent, less than about 25 percent, less than about 10 percent, less than about 5 percent, or substantially none of the agitation provided to the reaction medium in second stage esterification reactor 50 is provided by mechanical agitation. In another embodiment, second stage esterification reactor 50 is not equipped with an agitator, as illustrated in FIG. 2.

In one embodiment, the heat provided within second stage esterification reactor 50 increases the temperature of the reaction medium by at least about 5° F., at least about 10° F., or at least 25° F. Generally, the inlet temperature of the reaction medium can be in the range of from about 200° C. to about 300° C., from about 225° C. to about 280° C., or from 240° C. to 270° C., while the outlet temperature can be in the range of from about 230° C. to about 310° C., from about 240° C. to about 290° C., or from 245° C. to about 275° C. The overhead pressure in second stage esterification reactor 50 can be maintained at a pressure less than about 25 psig, less than about 15 psig, or less than 5 psig.

As a result of the esterification carried out in second stage esterification reactor 50, the stream entering second stage esterification reactor 50 via fluid inlet 48 can undergo an increase in conversion of at least about 2 percentage points, at least about 5 percentage points, or at least 10 percentage points between fluid inlet 48 and liquid outlet 52 of second stage esterification reactor 50. Typically, the stream entering fluid inlet 48 of second stage esterification reactor 50 can have a conversion of at least about 70 percent, at least about 75 percent, or at least 80 percent, while the stream exiting second stage esterification reactor 50 via conduit 130 can have a conversion of at least about 80 percent, at least about 90 percent, at least about 95 percent, or at least 98 percent. Generally, the residence time of the reaction medium in esterification vessel 50 can be greater than about 45 minutes, greater than about 60 minutes, or greater than about 70 minutes.

Turning now to the specific configuration of second stage esterification reactor 50. In the embodiment illustrated in FIG. 2, second stage esterification reactor 50 is a substantially cylindrical, vertically elongated, unagitated vessel with a maximum diameter (D) and a height-to-diameter (H:D) ratio in the range of from about 1.15:1 to about 10:1 or about 1.25:1 to about 8:1, or 1.4:1 to 6:1. Second stage esterification reactor 50 can comprise a lower end wall 54, a substantially cylindrical sidewall 56, and an upper end wall 58, which respectively define a fluid inlet 48, at least one liquid outlet 52, and a vapor outlet 60. In one embodiment, cylindrical sidewall 56 can comprise a plurality of vertically spaced liquid outlets illustrated in FIG. 2 as upper, middle, and lower liquid outlets 52a, 52b, 52c. Fluid inlet 48, liquid outlets 52a-c, and vapor outlet 60 can be spaced from one another in a manner that maximizes the conversion of the reaction medium flowing through second stage esterification reactor 50 relative to CSTRs of the prior art. For example, fluid inlet 48 can be positioned at a lower elevation than liquid outlets 52a-c, and vapor outlet 60 can be located at a higher elevation than liquid outlets 52a-c. In accordance with one embodiment, fluid inlet 48 can be located in the lower portion (e.g., the lower one-third), liquid outlets 52a-c can be located in the middle and/or upper portions (e.g., the middle one-third and/or the upper two-thirds), and vapor outlet 60 can be located in the top portion (e.g., the top one-third) of second stage esterification reactor 50.

Referring now to FIG. 3, in to one embodiment, fluid inlet 48 and/or liquid outlets 52 can be radially and/or circumferentially spaced from one another in a manner that maximizes conversion of the reaction medium in second stage esterification reactor 50 relative to conventional CSTRs. As illustrated in FIG. 3, second stage esterification reactor 50 can define an upright central axis of elongation 62 from which fluid inlet 48 and/or liquid outlets 52 can be radially spaced by respective distances $r_i$ and $r_o$. In one embodiment, $r_i$ can be at least about 0.15D, at least about 0.25D, or at least 0.4D, where "D" is the maximum horizontal dimension of the volume defined within esterification reactor 50. In one embodiment, $r_o$ can be at least about 0.4D, at least about 0.45D, or at least 0.5D. In addition to being radially spaced from central axis 62, fluid inlet 48 and liquid outlets 52 can be circumferentially spaced from one another by an angle Θ, as illustrated in FIG. 3. In one embodiment, Θ can be at least about 45°, at least about 90°, at least about 120°, or at least about 175°.

Referring again to FIG. 2, second stage esterification reactor 50 can provide heat to the reaction medium flowing therethrough via a plurality of vertically-spaced internal heat transfer members positioned generally above fluid inlet 48 and below vapor outlet 60. In one embodiment, the heat transfer members can be heat exchange tubes. The tubes can be arranged in two or more vertically-spaced groups, such as an upper, middle, and lower group 64a, 64b, and 64c as depicted in FIG. 2. Each group of heat exchange tubes can receive a stream of warmed heat transfer medium (HTM) through corresponding upper, middle, and lower HTM inlets 66a, 66b, 66c. The HTM then flows through the tubes in order to heat the reaction medium in second stage esterification reactor 50. In one embodiment of the present invention, the heat transfer coefficient associated with the heating of the reaction medium in second stage esterification reactor 50 can be in the range of from about 10 to about 150 BTU per hour per square foot per ° F. (BTU/h·ft$^2$·° F.), from about 25 to about 100 BTU/h·ft$^2$·° F., or from 35 to 80 BTU/h·ft$^2$·° F. The total amount of heat transferred to the reaction medium in second stage esterification reactor 50 by the heat transfer members can be in the range of from about 100 to about 5,000 BTU per pound of reaction medium (BTU/lb), about 400 to about 2,000 BTU/lb, or 600 to 1,500 BTU/lb. The cooled HTM exits the upper, middle, and lower groups of heat exchange tubes 64a-c via respective HTM outlets (not shown) and can be subsequently recirculated throughout the HTM system.

The flow of HTM into heat exchange tube groups 64a-c can be controlled by upper, middle, and lower HTM valves 68a, 68b, 68c. In one embodiment of the present invention, the groups of heat exchange tubes 64a-c can be independently operated so that one or more groups can provide heating to the reaction medium in second stage esterification reactor 50 while one or more groups provides substantially no heating. Operating one or more heat exchange tube groups 64a-c independently can increase the operational flexibility of second stage esterification reactor 50 over CSTRs of the prior art. For example, as illustrated in FIG. 2, upper HTM valve 68a can be closed to thereby prevent flow of warmed HTM into upper tube group 64a when the level of reaction medium 72 in second stage esterification reactor 50 is lower than upper tube group 64a. The ability of second stage esterification reactor 50 to operate with varying levels of reaction medium is in direct contrast with CSTRs of the prior art, which generally operate with a constant level of reaction medium in order to keep the heat transfer tubes completely submerged at all times during operation.

Referring again to FIG. 2, a predominantly vapor product can exit second stage esterification reactor 50 via vapor outlet 60. In one embodiment of the present invention, the predominantly vapor product can comprise water and/or alcohol, such as, for example ethylene glycol. After exiting second stage esterification reactor 50, the vapor stream flows into conduit 128, whereafter it can be routed to further processing, storage, and/or disposal.

As illustrated in FIG. 2, a liquid product can be withdrawn from second stage esterification reactor 50 via one or more liquid outlets 52a-c. In one embodiment wherein one or more groups of heat exchange tubes 64a-c are operated independently, one or more corresponding liquid product outlets can be isolated as well using product valves 70a-c. For example, when the reaction medium level 72 is below upper heat exchange tube group 64a and the tubes are isolated from providing heat as described previously, upper liquid outlet 52a may additionally be isolated by closing upper product valve 70a, as shown in FIG. 2. Similarly, the ability to independently isolate one or more liquid outlets provides additional operational flexibility to second stage esterification reactor 50.

The liquid esterification product exits second stage esterification reactor 50 via conduit 130 and can thereafter be routed to storage or further processing, such as, for example, in a downstream polycondensation section.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

Definitions

As used herein, the terms "a," "an," "the," and "said" means one or more.

As used herein, the term "agitation," refers to work dissipated into a reaction medium causing fluid flow and/or mixing.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or elements recited after the term, where the element or elements listed after the transition term are not necessarily the only elements that make up of the subject.

As used herein, the terms "containing," "contains," and "contain" have the same open-ended meaning as "comprising," "comprises," and "comprise," provided below.

As used herein, the term "distillative separation" refers to separating one or more chemical substances from one or more other chemical substances based on the relative volatilities of the substances being separated.

As used herein, the terms "having," "has," and "have" have the same open-ended meaning as "comprising," "comprises," and "comprise," provided above As used herein, the terms "including," "includes," and "include" have the same open-ended meaning as "comprising," "comprises," and "comprise," provided above.

As used herein, the term, "mechanical agitation," refers to agitation of a reaction medium caused by physical movement of a rigid or flexible element(s) against or within the reaction medium.

As used herein, the term "reaction medium" refers to any medium subjected to chemical reaction.

As used herein, the term "residue" refers to the moiety that is the resulting product of the chemical species in a particular reaction scheme or subsequent formulation or chemical product, regardless of whether the moiety is actually obtained from the chemical species.

Claims not Limited to Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A process comprising:
   (a) subjecting a reaction medium to esterification in a vertically elongated esterification reactor, wherein said esterification reactor defines a single vessel having a fluid inlet and at least two separate outlets comprising a liquid outlet through which a reaction medium is discharged from said esterification reactor and a vapor outlet through which vapor esterification by-product is discharged from said esterification reactor, wherein said vapor outlet is located on the same vessel at a higher elevation than said liquid outlet, said fluid inlet located at a lower elevation than a liquid outlet; and wherein said esterification reactor provides heat to the reaction medium inside the esterification reactor; and
   (b) said reaction medium in said esterification reactor is either not mechanically agitated, or if mechanically agitated, less than about 50 percent of agitation to the reaction medium is provided by mechanical agitation.

2. The process of claim 1, wherein the reaction medium entering the fluid inlet has an initial conversion of at least about 70 percent.

3. The process of claim 2, wherein the reaction medium discharged through the liquid outlet has a final conversion of at least about 80 percent.

4. The process of claim 3, wherein said initial conversion is at least about 75 percent and said final conversion is at least about 85 percent.

5. The process of claim 1, wherein said esterification reactor has a height-to-diameter ratio in the range of from about 1.15:1 to about 10:1.

6. The process of claim 1, wherein said fluid inlet is located in the lower one-third of said esterification reactor, wherein said liquid outlet is located in the upper two-thirds of said esterification reactor.

7. The process of claim 1, wherein said esterification reactor defines an upright central axis of elongation, wherein said liquid outlet is radially spaced from said central axis.

8. The process of claim 7, wherein said fluid inlet is radially spaced from said central axis.

9. The process of claim 8, wherein said esterification reactor has a maximum horizontal diameter (D), wherein said liquid outlet is radially spaced at least about 0.4D from said central axis and said fluid inlet is radially spaced at least about 0.15D from said central axis.

10. The process of claim 8, wherein said fluid inlet and liquid outlet are circumferentially spaced from one another by at least about 90 degrees.

11. The process of claim 1, wherein said esterification reactor defines a fluid inlet and a plurality of vertically spaced liquid outlets, wherein at least a first portion of said reaction medium enters said esterification reactor through said fluid inlet, wherein at least a second portion of said reaction medium is discharged from said esterification reactor through one or more of said liquid outlets, wherein said fluid inlet is located at a lower elevation than said liquid outlets.

12. The process of claim 11, wherein said esterification reactor defines an upright central axis of elongation, wherein said fluid inlet and said liquid outlets are radially spaced from said central axis, wherein said inlet and outlet are circumferentially spaced from one another by at least about 120 degrees.

13. The process of claim 11, wherein said outlets are defined in an upright substantially cylindrical side wall of said esterification reactor, wherein said inlet is defined in a lower end wall of said esterification reactor.

14. The process of claim 1, further comprising heating said reaction medium in said esterification reactor during said esterification.

15. The process of claim 14, wherein said heating is provided by a plurality of vertically spaced heat transfer members.

16. The process of claim 15, wherein said vertically spaced heat transfer members are capable of being independently operated so that one or more of said heat exchange members can provide heating of said reaction medium while one or more other of said heat exchange members provides no heating of said reaction medium.

17. The process of claim 14, wherein said heating is provided by flowing a heat transfer medium through a plurality of vertically spaced groups of heat exchange tubes.

18. The process of claim 17, further comprising, substantially eliminating flow of said heat transfer medium though at least one of said groups of heat exchange tubes when the level of said reaction medium is lower than at least one of said groups of heat exchange tubes.

19. The process of claim 1, wherein less than about 23 percent of said agitation is provided by mechanical agitation.

20. The process of claim 1, wherein said reaction medium receives substantially no mechanical agitation during said esterification.

21. The process of claim 1, wherein the residence time of said reaction medium in said esterification reactor is greater than about 45 minutes.

22. The process of claim 1, wherein said esterification is carried out at a temperature in the range of from about 200° C. to about 300° C.

23. The process of claim 1, wherein said esterification is carried out at a pressure less than about 25 psig.

24. A process comprising:
(a) subjecting a first reaction medium to esterification in a first esterification zone defined by a first esterification reactor having a fluid inlet, a liquid outlet, and a vapor outlet, to thereby produce a first product having a conversion of at least about 70 percent and a vapor byproduct exiting the first esterification reactor through the vapor outlet on said first esterification reactor; and
(b) subjecting at least a portion of said first product to further esterification in a second esterification zone defined by a second esterification reactor having a fluid inlet and at least two separate outlets comprising a liquid outlet and a vapor outlet to thereby produce a second product having a conversion of at least about 80 percent discharged from said second esterification reactor through the liquid outlet on the second esterification reactor that is located at a higher elevation than the fluid inlet and having a vapor byproduct discharged from the second esterification reactor through the vapor outlet on the second esterification reactor, wherein said second esterification reactor provides heat to the reaction medium.

25. The process of claim 24, wherein said first product has a conversion of at least about 75 percent and said second product has a conversion of at least about 85 percent.

26. The process of claim 24, wherein said second esterification reactor is vertically elongated.

27. The process of claim 24, wherein said second esterification reactor vapor outlet is located at a higher elevation than said second esterification reactor liquid outlet.

28. The process of claim 24, wherein said second esterification reactor fluid inlet is located in the lower one-third of said second esterification reactor, wherein said second esterification reactor liquid outlet is located in the upper two-thirds of said second esterification reactor.

29. The process of claim 24, wherein said second esterification reactor defines an upright central axis, wherein said second esterification reactor has a maximum horizontal diameter (D), wherein said second esterification reactor liquid outlet is radially spaced at least 0.4D from said central axis and said second esterification reactor fluid inlet is radially spaced at least 0.15D from said central axis, wherein said second esterification reactor fluid inlet and second esterification reactor liquid outlet are circumferentially spaced from one another by at least about 90 degrees.

30. The process of claim 24, wherein said second esterification reactor defines a plurality of vertically spaced liquid outlets for discharging at least a portion of said second product, wherein said second esterification reactor fluid inlet is located at a lower elevation than said second esterification reactor liquid outlets.

31. The process of claim 30, wherein said second esterification reactor defines an upright central axis, wherein said second esterification reactor fluid inlet and said second esterification reactor liquid outlets are radially spaced from said central axis, wherein said second esterification reactor fluid inlet and second esterification reactor liquid outlets are circumferentially spaced from one another by at least about 120 degrees.

32. The process of claim 24, further comprising heating a reaction medium in said second esterification reactor.

33. The process of claim 32, wherein said heating is provided via indirect heat exchange with a heat transfer medium flowing though a plurality of vertically spaced groups of heat exchange tubes.

34. The process of claim 33, further comprising, substantially eliminating flow of said heat transfer medium though at least one of said groups of heat exchange tubes when the level of said second esterification reactor reaction medium is lower than at least one of said groups of heat exchange tubes.

35. The process of claim 24, further comprising, optionally, agitating a reaction medium in said second esterification reactor, wherein less than about 50 percent of said agitation is provided by mechanical agitation.

36. The process of claim 35, wherein said reaction medium receives substantially no mechanical agitation in said second esterification reactor.

* * * * *